Patented Mar. 21, 1939

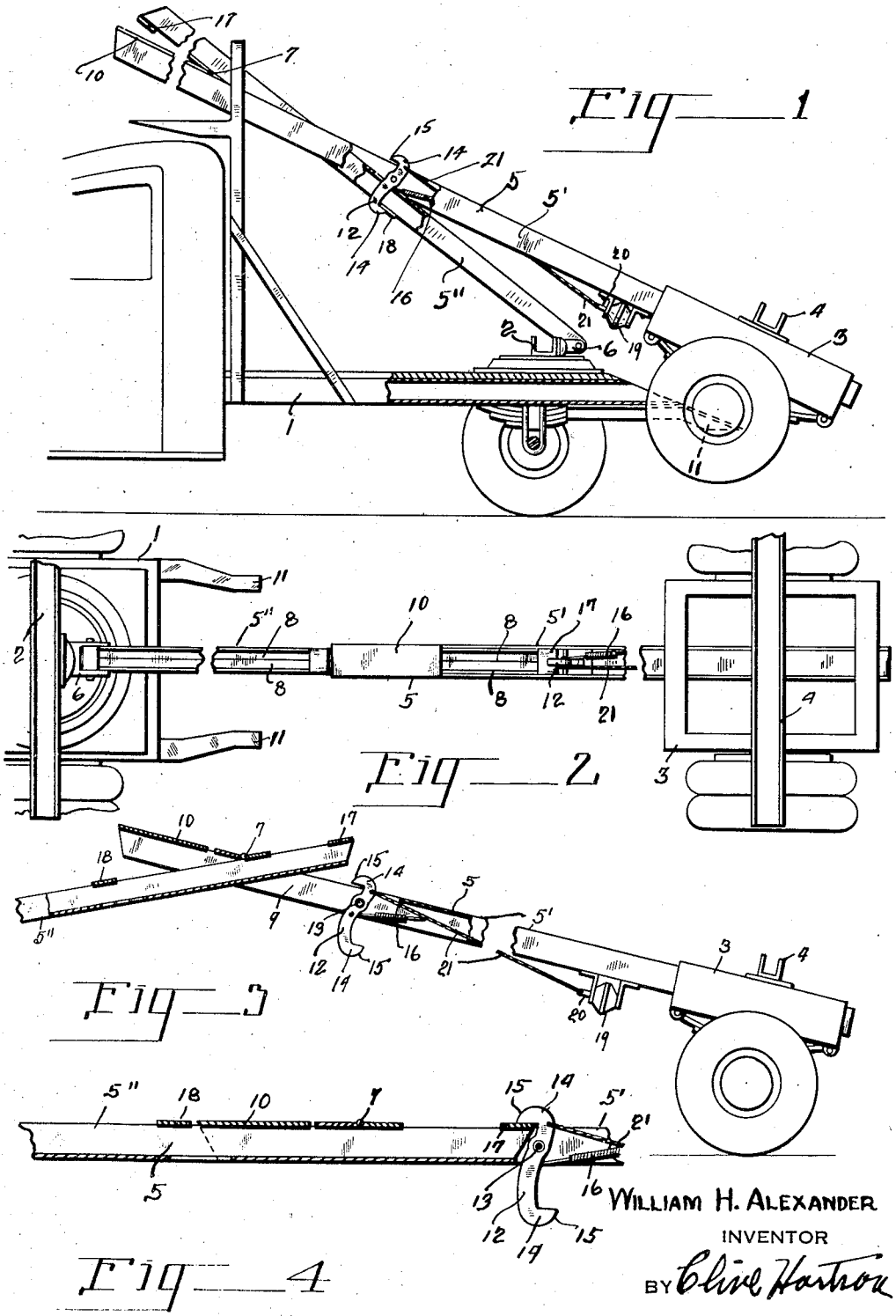

2,151,343

UNITED STATES PATENT OFFICE 2,151,343

FOLDING REACH

William H. Alexander, Klamath Falls, Oreg.

Application August 6, 1937, Serial No. 157,750

3 Claims. (Cl. 280—142)

My invention relates to improvements in folding reaches for logging trailers of the type which fold to permit the trailer to be carried by the tractive vehicle.

An object of the invention is to provide improvements in the hinging or pivoting means for folding the reach.

An object of the invention is to provide an improved and single means for securing the reach in either folded or unfolded position.

An object of the invention is to provide a single means for securing the reach in either folded or unfolded position which is easy and inexpensive to manufacture and positive and simple to operate.

These and other objects of the invention will become readily apparent upon a study of the following description when read in connection with the accompanying drawing which forms a part thereof.

In the drawing:

Figure 1 is a side elevation of a truck and two-wheel logging trailer. This view shows the reach in folded position which enables the truck to carry the trailer.

Figure 2 is a plan view showing the reach in unfolded or extended position and the trailer in trailing position.

Figure 3 is a partial longitudinal sectional view of the reach and side elevation of the trailer. This view shows in detail the single means, or dog, for securing the reach in unfolded or folded position. In this view the dog is disengaged and the reach is between extremes of folded and unfolded positions.

Figure 4 is a fragmentary longitudinal section of the reach showing it in unfolded position and the dog in engagement and securing it in such position.

In the drawing, similar characters refer to similar parts throughout the several views.

Referring now in detail to the drawing, the numeral 1 indicates a conventional logging truck provided with a transverse bolster 2 to support the forward end of a log load. Numeral 3 indicates a conventional two-wheel log-trailer provided with a bolster 4 to support the rear end of a log load. The trailer is connected to the truck by means of a reach 5. The forward end of the reach is pivotally connected to a suitable bracket 6 mounted in any preferred manner to truck 1.

The reach 5 is made in two sections 5' and 5" hinged together by means of a pin 7. Both sections are formed of parallelly spaced members 8 with the spacing of such members forming section 5" being closer to allow its rearward end to fit in between the forward ends of the members forming section 5', as shown in Figure 2, when the reach is in unfolded or extended position.

Members 8 are preferably channel iron with the legs cut out in the forward end of section 5', as shown at 9, to permit pivotal movement of section 5".

The pivot pin 7 is positioned at the top of the sections 5' and 5" so that when the trailer is held against rearward movement and the truck is backed the reach will fold or jack knife in an upward direction as shown in Figure 3.

The ends of both sections 5' and 5" project beyond the pivot 7 and across the ends of the members 5' is secured a cross member 10 which bears upon the top of the members 5" and prevents the reach from sagging when in an extended position.

Figure 1 shows the reach in folded position with the trailer 3 being supported by brackets 11 projecting from the end of the truck 1, while Figures 2 and 4 show the reach in extended position with the trailer trailing the truck. Latching means are provided for securing the reach in either of these two positions, which means must be released before the reach can move from one of said positions to the other. This latch means consists of the dog bar 12 pivoted at 13 to section 5'. Upper and lower hooks which form dogs 14 are provided on the bar each side of pivot 13, and these in turn are provided with cam faces 15. A spring 16 is connected from a point on the dog bar below pivot 13 to one of the members 8 of section 5'. The contractive action of this spring moves the upper dog 14 forwardly (to the left in the drawing) and the lower dog rearwardly.

When the reach is unfolded, during such unfolding movement a cross member engages the cam 15 of the upper dog and moves such dog rearwardly against the action of spring 16 until the reach is fully extended. When the reach is fully extended the upper dog, by action of spring 16, moves over the cross member 17 and secures the reach against folding action. When the dog bar is moved against the action of spring 16 the dog disengages the cross member, releasing it, thus permitting the reach to be folded. When the upper dog is released by movement of the dog bar in the proper direction, the reach can be folded to the position shown in Figure 1. When the reach approximates completion of its folding movement, the cam 14 of the lower dog engages a cross member and the lower dog is moved forwardly against the action of spring 16 until the dog slips over cross member 18. When the lower dog has slipped over cross member 18 it holds the reach against unfolding movement until the dog bar is properly manipulated in order to disengage the lower dog from cross member 18.

Any suitable means may be employed for manipulating dog bar 12. In the present instance power means are preferred. Such means consists of a conventional vacuum booster of the diaphragm type having a rod 20 connected to its diaphragm. A cable 21, has one end connected to the dog bar at a point above pivot 13 and its other end connected to rod 20. When rod 20 is moved to the right, through manipulation of the booster, the dogs 14 are moved to a position where they disengage cross members 17 or 18 as the case may be. When manipulation of the booster is discontinued, spring 16 moves the dogs to engaging position as heretofore described. The booster is connected by suitable flexible conduits, not shown, and valve control mechanisms, likewise not shown, to the intake manifold of the engine operating truck 1. The release mechanism just described permits the disengagement of the dogs without the necessity of the truck driver leaving the driving position. When the reach is in folded position and the lower dog 14 is released, the trailer slides off the brackets 11 and thereafter the truck can move forwardly to a position wherein the reach will be in extended position.

I do not wish to be limited to the precise form of the invention as shown and described, but reserve the right to modify it in accordance with the terms of the claims which follow.

Having described my invention, I claim:

1. In a folding reach, a reach comprising two pivotally connected sections, with an extension of one to rest upon a portion of the other when the reach is extended to prevent sagging, a dog bar pivotally mounted to one of said sections, said bar having hook ends forming a dog above the pivot and a dog below the pivot, a pair of members on the other section, one of the members being engageable by the upper dog to secure the reach in unfolded position, and the other member being engageable by the other dog to secure the reach in folded position.

2. In a folding reach, a reach comprising two pivotally connected sections with an extension of one to rest upon a portion of the other when the reach is extended to prevent sagging, a dog bar pivotally mounted to one of said sections, said bar having hook ends forming a dog above the pivot and a dog below the pivot, a pair of cross members on the other section, one of which is for engagement by one of the dogs to secure the reach in unfolded position and the other for engagement by the other dog to secure the reach in folded position, and yieldable means for holding the dogs in the engagement aforesaid.

3. In a folding reach, a reach comprising two pivotally connected sections with an extension of one to rest upon a portion of the other when the reach is extended to prevent sagging, a dog bar pivotally mounted to one of said sections, said bar having hook ends forming a dog above the pivot and a dog below the pivot, a pair of cross members on the other section one of which is for engagement by one of the dogs to secure the reach in unfolded position and the other for engagement by the other dog to secure the reach in folded position, yieldable means holding the dogs in the engagement aforesaid, and means for releasing the dogs against the action of said yieldable means.

WILLIAM H. ALEXANDER.